United States Patent
Odani

(10) Patent No.: US 12,449,171 B2
(45) Date of Patent: Oct. 21, 2025

(54) MIXED REFRIGERANT PRODUCTION APPARATUS, MIXED REFRIGERANT PRODUCTION METHOD, CONTAINER OF MIXED REFRIGERANT, METHOD OF USE THEREOF, CONTAINER OF MIXED REFRIGERANT HAVING GAS-LIQUID MIXING FUNCTION AND METHOD OF USE THEREOF

(71) Applicant: CPM HOLDING CO., LTD., Tokyo (JP)

(72) Inventor: Hajime Odani, Tokyo (JP)

(73) Assignee: CPM Holding Co., Ltd., Tokyo (JP)

( * ) Notice: Subject to any disclaimer, the term of this patent is extended or adjusted under 35 U.S.C. 154(b) by 155 days.

(21) Appl. No.: 17/758,029

(22) PCT Filed: Dec. 22, 2020

(86) PCT No.: PCT/JP2020/047993
§ 371 (c)(1),
(2) Date: Jun. 26, 2022

(87) PCT Pub. No.: WO2021/132256
PCT Pub. Date: Jul. 1, 2021

(65) Prior Publication Data
US 2023/0035949 A1   Feb. 2, 2023

(30) Foreign Application Priority Data

Dec. 27, 2019 (JP) .................. 2019-238268

(51) Int. Cl.
*F25B 45/00* (2006.01)
*C09K 5/04* (2006.01)

(52) U.S. Cl.
CPC .............. *F25B 45/00* (2013.01); *C09K 5/041* (2013.01)

(58) Field of Classification Search
CPC .... F25B 45/00; F25B 2345/001; F25B 43/00; C09K 5/041; F17C 7/00; F17C 2265/015
See application file for complete search history.

(56) References Cited

U.S. PATENT DOCUMENTS 6,000,230 A * 12/1999 Kanno .................. F17C 7/00
141/47

FOREIGN PATENT DOCUMENTS

| CN | 1259883 A |   | 7/2000 |           |
|----|-----------|---|--------|-----------|
| CN | 1441214 A | * | 9/2003 | F25B 9/008 |
| JP | S4874641 A | * | 9/1972 |           |

* cited by examiner

*Primary Examiner* — Frantz F Jules
*Assistant Examiner* — Martha Tadesse
(74) *Attorney, Agent, or Firm* — Rosenberg, Klein & Lee

(57) ABSTRACT

It is an object of the present invention to provide an apparatus and method which satisfies the below three requirements at once.
(1) The composition ratio of mixed refrigerant in a base material container at the time of shipment is appropriate.
(2) The composition ratio of mixed refrigerant is not changed when it is filled into a heat pump system.
(3) Mixed refrigerant gets uniformly dispersed while circulating in a heat pump system.
There is provided a mixed refrigerant producing apparatus comprising a base material container containing mixed refrigerant separated in gas and liquid phases, a gas-liquid mixing device capable of uniformly mixing the gas and liquid phases of the mixed refrigerant, a liquid-phase valve allowing the liquid phases of the mixed refrigerant in said base material container to be introduced into said gas-liquid mixing device, a gas-phase valve allowing the gas phases of the mixed refrigerant in said base material container to be introduced into said gas-liquid mixing device and an outlet (Continued)

valve allowing the mixed refrigerant in said gas-liquid mixing device to be filled into a small portable container, wherein said outlet valve opens when said gas-liquid mixing device has been operated during a predetermined time to uniformly mixing the mixed refrigerant contained therein.

6 Claims, 10 Drawing Sheets

(a) cooling operation (b) heating operation

MIXED REFRIGERANT PRODUCTION APPARATUS, MIXED REFRIGERANT PRODUCTION METHOD, CONTAINER OF MIXED REFRIGERANT, METHOD OF USE THEREOF, CONTAINER OF MIXED REFRIGERANT HAVING GAS-LIQUID MIXING FUNCTION AND METHOD OF USE THEREOF

TECHNICAL FIELD

The present invention relates to an apparatus for producing refrigerant used in a heat pump system by mixing more than one materials with a controlled mixture ratio, and also to a container of mixed refrigerant and to method of filling mixed refrigerant into a heat pump system.

BACKGROUND ART

Patent Document 1 discloses methods of producing hydrocarbon mixed refrigerant. The method comprises introducing into a vacuumed container a first material contained in the base material container that has the lowest filling pressure, and introducing into a vacuumed container a second material contained in another base material container that has filling pressure higher by 0.3 MPa or more than that of the above base material.

Patent Document 2 discloses hydrocarbon mixed refrigerant which enables to lower energy consumption, to prevent global warming, to substantially lower disposal costs and to reduce the amount of mixed refrigerant consumed.

Patent Document 3 discloses hydrocarbon mixed refrigerant and method of producing the same which enables to prevent performance degradation of a cooling cycle by predicting the changes of the ratio of non-azeotropic refrigerant and restoring the initial ratio.

Patent Document 4 discloses a heat pump system capable of uniformly dispersing non-azeotropic refrigerant separated in two liquid phases.

Patent Document 5 discloses a container of refrigerant in which the composition ratio of the content does not change even when the amount of the content becomes small. The container comprises an upper and lower chamber and a vertically slidable partition wall therebetween.

Patent Document 6 discloses methods of filling non-azeotropic refrigerant into a compressor without causing change of the composition ratio of the refrigerant. The methods comprise connecting a base material container to a refrigerant pipe between a compressor and a heat pump by way of a three-way joint and filling non-azeotropic refrigerant in the base material container into the system.

Patent Document 7 discloses methods of filling non-azeotropic refrigerant into a compressor without causing change of the composition ratio of the refrigerant. The methods comprise connecting a base material container to the inlet of an accumulator disposed on the inlet side of a compressor and filling non-azeotropic refrigerant in the base material container gradually into the accumulator.

Patent Document 8 discloses methods of filling non-azeotropic refrigerant in small batches.

Patent Document 9 discloses methods of filling non-azeotropic refrigerant while maintaining the change of the composition ratio of the refrigerant within a permissible range.

Patent Document 10 discloses methods of filling non-azeotropic refrigerant while maintaining the change of the composition ratio of the refrigerant within a permissible range.

Patent Document 11 discloses a cooling cycle equipped with a gas-liquid mixing apparatus for the purpose of improving operation efficiency. The gas-liquid mixing apparatus typically comprises a decompression device, a refrigerant inlet/outlet and a U-shaped conduit.

Patent Document 12 discloses an apparatus for recombining impurities contained in refrigerator. The apparatus comprises a spiral groove formed on the inside the wall of a cylindrical casing so as to shear the refrigerant and allow it to be recombined.

Patent Document 13 discloses a stirring apparatus used in a heat pump system. The stirring apparatus comprises an unfixed spiral coil spring in a cylindrical casing.

Patent Document 14 discloses a liquefaction promoting apparatus used in a heat pump system. The liquefaction promoting apparatus comprises a closed cylindrical casing which contains a coil spring having a conical part.

Patent Document 15 discloses a refrigerant processing apparatus used in an air-conditioning system. The refrigerant processing apparatus comprises a cylindrical casing formed with a spiral groove on the inner wall thereof and pipes formed with a spiral groove on the outer wall thereof.

Patent Document 16 discloses a refrigerant processing apparatus comprising a coil spring which is vibrable and oscillable inside the apparatus.

PRIOR ART DOCUMENT

Patent Document

Patent Document 1: Japanese Patent Laid-open No. 2011-132306A1
Patent Document 2: Japanese Patent Laid-open No. 2009-081673A1
Patent Document 3: Japanese Patent Laid-open No. 2008-274183
Patent Document 4: Japanese Patent Laid-open No. 2007-155175
Patent Document 5: Japanese Patent Laid-open No. 2000-035195
Patent Document 6: Japanese Patent Laid-open No. H11-270933
Patent Document 7: Japanese Patent Laid-open No. H11-211290
Patent Document 8: Japanese Patent Laid-open No. H11-124569
Patent Document 9: Japanese Patent Laid-open No. H10-197108
Patent Document 10: Japanese Patent Laid-open No. H10-160296
Patent Document 11: Japanese Patent Published No. 3055854
Patent Document 12: Japanese Patent Laid-open No. 2014-161812
Patent Document 13: Japanese Patent Laid-open No. 2015-212601
Patent Document 14: Japanese Patent Published No. 5945377
Patent Document 15: Japanese Patent Laid-open No. 2017-142601

Patent Document 16: Japanese Patent Published No. 6300339

DISCLOSURE OF THE INVENTION

Problems to be Solved by the Invention

Patent Documents 1 to 10 bring to light the problem that change of composition ratio of refrigerant can occur while filling the refrigerant into the het pump system or while fractioning the refrigerant into small batches.

Patent Documents 1 and 8 teach that providers need to control the composition ratio of refrigerant in each base material container so as not to change on and before providing it.

Patent Documents 5, 6, 7, 9 and 10 teach that it is necessary to fill refrigerant while maintaining the change of the composition ratio of the refrigerant within a permissible range.

Patent Document 4 teaches that mixed refrigerant needs to be uniformly dispersed when it is circulated in a heat pump system.

Patent Document 11 also teaches that promoting liquefaction of the gas-liquid mixture fluid circulating in a heat pump system results in improving its operation efficiency.

Patent Documents 12 to 15 teach stirring apparatuses each having a cylindrical casing formed with an inner-wall spiral groove or containing spiral coil spring therein.

Patent Document 16 teaches a liquefaction promoting apparatus comprising a coil spring which is vibrable and oscillable inside the apparatus.

The inventor has contemplated on the above problems of uniform mixture of refrigerant and concluded that the problems will be solved only by satisfying the below three requirements at once.
  (1) The composition ratio of mixed refrigerant in a base material container at the time of shipment is appropriate.
  (2) The composition ratio of mixed refrigerant is not changed when it is filled into a heat pump system.
  (3) Mixed refrigerant gets uniformly dispersed while circulating in a heat pump system.

The inventor has conducted repeated experiments in an attempt to satisfy the above three requirements by utilizing a stirring apparatus and a liquefaction promoting apparatus, and thus invented the claimed invention.

It is an object of the present invention to provide an apparatus and method which satisfies the below three requirements at once.
  (1) The composition ratio of mixed refrigerant in a base material container at the time of shipment is appropriate.
  (2) The composition ratio of mixed refrigerant is not changed when it is filled into a heat pump system.
  (3) Mixed refrigerant gets uniformly dispersed while circulating in a heat pump system.

Means for Solving the Problems

According to the present invention, there is provided a mixed refrigerant producing apparatus comprising a base material container containing mixed refrigerant separated in gas and liquid phases; a gas-liquid mixing device capable of uniformly mixing the gas and liquid phases of the mixed refrigerant; a liquid-phase valve allowing the liquid phases of the mixed refrigerant in said base material container to be introduced into said gas-liquid mixing device; a gas-phase valve allowing the gas phases of the mixed refrigerant in said base material container to be introduced into said gas-liquid mixing device; and an outlet valve allowing the mixed refrigerant in said gas-liquid mixing device to be filled into a small portable container; wherein said outlet valve opens when said gas-liquid mixing device has been operated during a predetermined time to uniformly mixing the mixed refrigerant contained therein.

This apparatus enables to maintain the composition ratio of the refrigerant filled in a small portable container within a permissible range.

According to the present invention, there is provided a method of producing mixed refrigerant using the above mixed refrigerant producing apparatus comprising the steps of introducing into said gas-liquid mixing device the gas phase and the liquid phase of the mixed refrigerant respectively; operating said gas-liquid mixing device during a predetermined time; and filling into the small portable container the mixed refrigerant in said gas-liquid mixing device.

This method enables to maintain the composition ratio of the refrigerant filled in a small portable container within a permissible range.

According to the present invention, there is provided a container of mixed refrigerant capable of containing mixed refrigerant having an amount and a composition ratio suitable to be introduced into a particular heat pump system, said container of mixed refrigerant comprising two openable/closable openings which are adaptable to the pipelines of the heat pump system, said container of mixed refrigerant being configured to allow mixed refrigerant to flow in through one of said openings, to pass therethrough and to flow out of the other of said openings while the heat pump system is in operation.

This apparatus enables the mixed refrigerant contained in the container to be introduced into the heat pump system while maintaining a suitable composition ratio of the mixed refrigerant.

According to the present invention, there is provided a method of use of the container of mixed refrigerant as set forth in claim 3 comprising the steps of providing a bypass passage on a pipeline of a heat pump system; providing said container of mixed refrigerant such that said two openable/closable openings communicate with the bypassed pipeline; vacuuming the pipeline through said bypass passage; closing said bypass passage such that said container of mixed refrigerant forms part of the pipeline of the heat pump system; filling into the heat pump system the mixed refrigerant contained in said container of mixed refrigerant by gradually opening said two openable/closable openings; and operating the heat pump system so as to allow the mixed refrigerant contained in said container of mixed refrigerant to go around in the system.

This method enables the mixed refrigerant contained in the container to be introduced into the heat pump system while maintaining a suitable composition ratio of the mixed refrigerant.

According to the present invention, there is provided a container of mixed refrigerant capable of containing mixed refrigerant having an amount and a composition ratio suitable to be introduced into a particular heat pump system comprising two openable/closable openings which are adaptable to the pipelines of the heat pump system, and gas-liquid mixing function.

This container of mixed refrigerant enables the mixed refrigerant contained in the container to be introduced into the heat pump system while maintaining a suitable composition ratio of the mixed refrigerant, and to be uniformly mixed by the action of the gas-liquid mixing function.

According to the present invention, there is provided a method of use of the container of mixed refrigerant as set forth in claim 5 comprising providing a bypass passage on a pipeline of a heat pump system; providing said container of mixed refrigerant such that said two openable/closable openings communicate with the bypassed pipeline; vacuuming the pipeline through said bypass passage; closing said bypass passage such that said container of mixed refrigerant forms part of the pipeline of the heat pump system; filling into the heat pump system the mixed refrigerant contained in said container of mixed refrigerant by gradually opening said two openable/closable openings; and operating the heat pump system so as to allow the mixed refrigerant contained in said container of mixed refrigerant to go around in the system, whereby said gas-liquid mixing function of said container of mixed refrigerant allows the mixed refrigerant flowing therethrough to be mixed.

This container of mixed refrigerant enables the mixed refrigerant contained in the container to be introduced into the heat pump system while maintaining a suitable composition ratio of the mixed refrigerant, and to be uniformly mixed by the action of the gas-liquid mixing function.

Effects of the Invention

The mixed refrigerant producing apparatus, the method of producing the same, the container of mixed refrigerant and the method of use of the same according to the present invention enables to maintain the composition ratio of mixed refrigerant within a suitable range, by means of uniform mixing of mixed refrigerant, while it is contained in the container, while it is being introduced into a heat pump system and while it is flown in the heat pump system. This contributes to improvement of operation efficiency and reduction of energy consumption in the heat pump system.

BEST MODE FOR CARRYING OUT THE INVENTION

Figure 1:
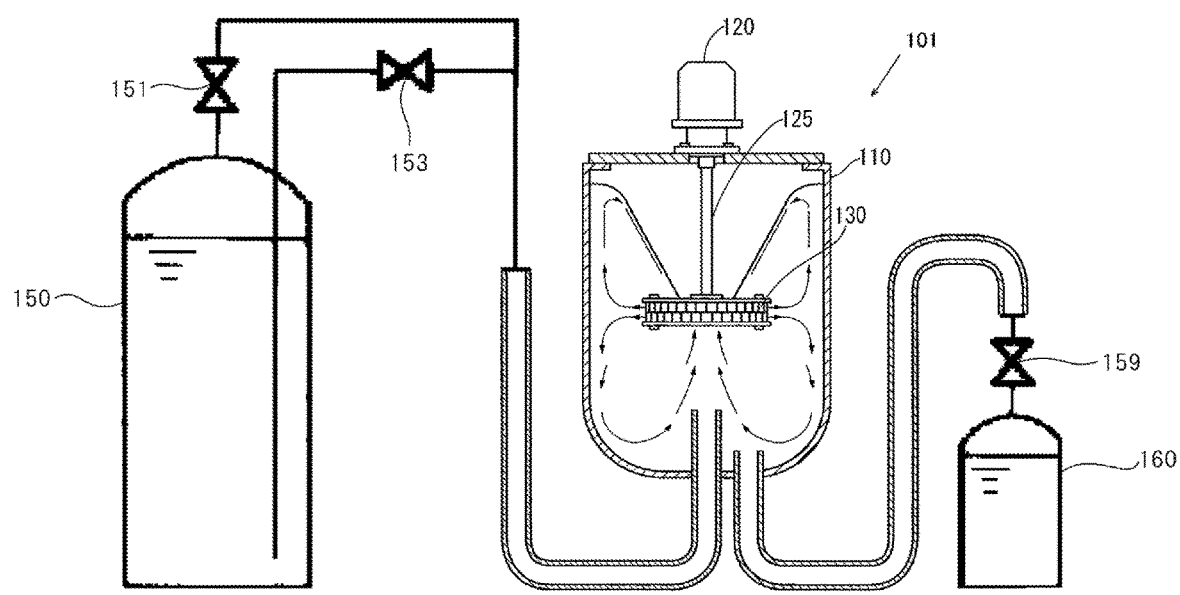
FIG. 1 is a view showing an embodiment of the mixed refrigerant producing apparatus according to the present invention.

Described hereinafter with reference to the attached drawings are detailed embodiments of the present invention. In the figures, like reference numerals refer to like members which have similar composition and operation.

Embodiment

<<Mixed Refrigerant Producing Apparatus>>
<<Rotating-Type Gas-Liquid Mixing Device>>

FIG. 1 is a view showing an embodiment of the mixed refrigerant producing apparatus according to the present invention. A rotating-type gas-liquid mixing device 101 is employed to when mixed refrigerant contained in a base material container 150 is filled into a small portable container 160 so as to maintain the composition ratio of the mixed refrigerant within a suitable range.

The rotating-type gas-liquid mixing device 101 has a stirring sink 110, which houses a rotating motor 120, a mixing rotator 130 and a rotating shaft 125 connecting therebetween. The rotating motor 120 drives the mixing rotator 130 to rotate so as to uniformly mix the content in the stirring sink 110. The structure of the mixing rotator 130 is described below.

Figure 2:
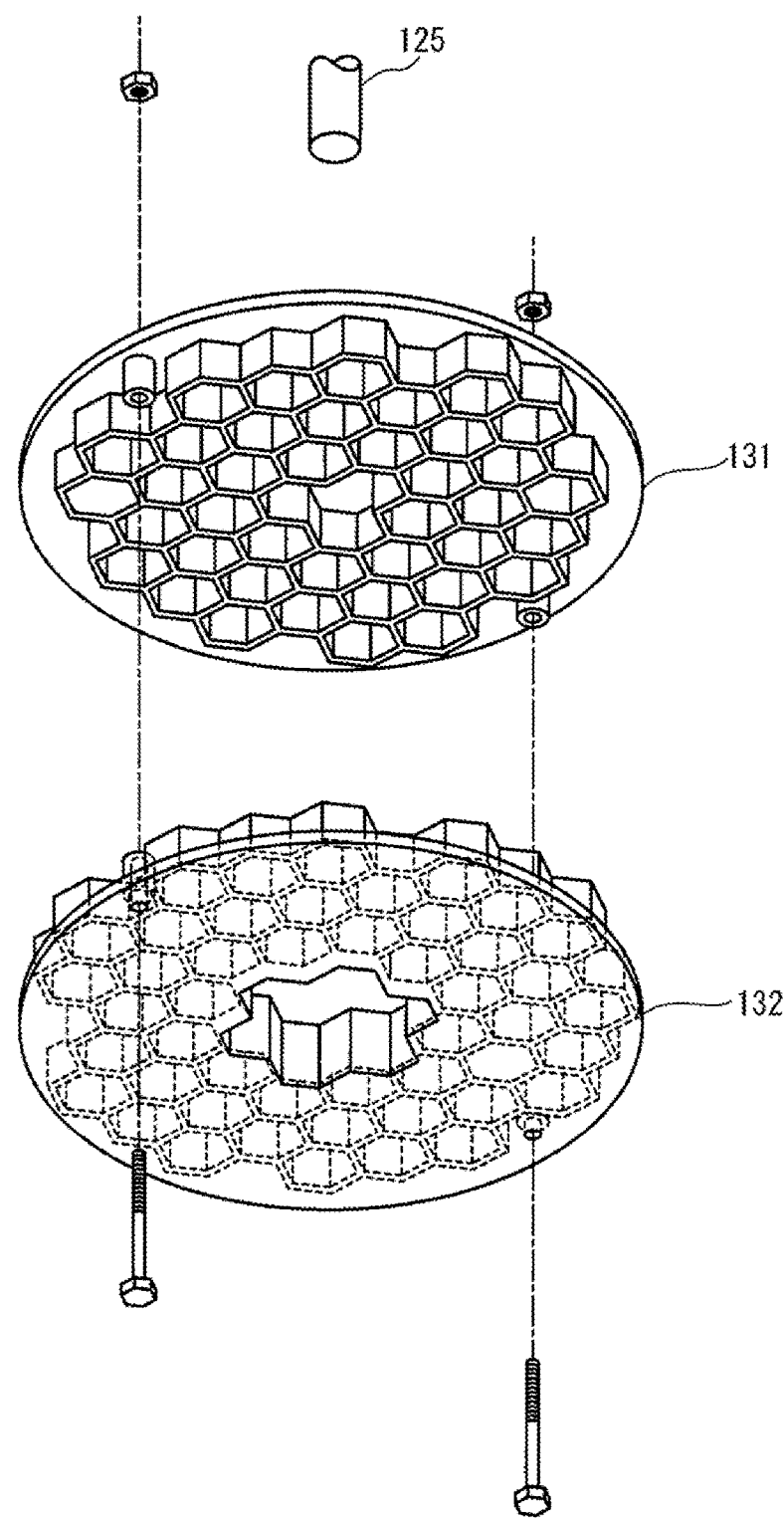
FIG. 2 is a view showing the structure of a mixing rotator comprising a large disk and a small disk.

FIG. 2 is a view showing the structure of the mixing rotator 130 comprising a large disk 131 and a small disk 132. As shown in FIG. 2, the large disk 131 and the small disk 132 are each formed with honeycomb cells on one surface. The two disks are combined such that the honeycomb cells on the both surfaces face each other and are fixed to each other using bolts and nuts. The two disks are disposed such that the hexagonal cells of the two disks do not overlap each other.

The mixing rotator 130 is connected to the rotating shaft 125. The large disk 131 and the small disk 132 are each formed with a flow hole so as to pass the fluid therethrough. As shown in FIG. 2, the large disk 131 has a larger flow hole than the small disk 132.

Figure 3:
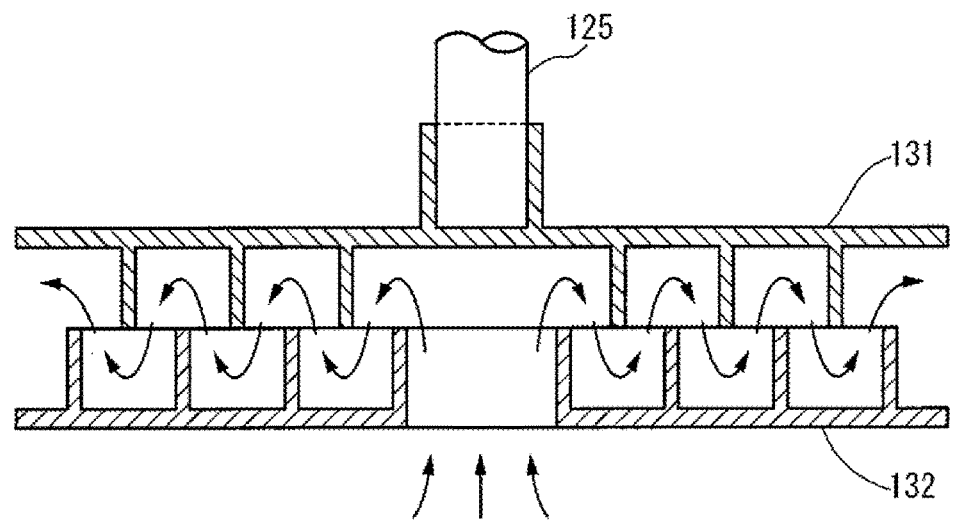
FIG. 3 is a cross-sectional view showing the detailed configuration of the mixing rotator and the flow of the fluid therein.

FIG. 3 is a cross-sectional view showing the detailed configuration of the mixing rotator 130 and the flow of the fluid therein. As illustrated, the fluid is introduced into the mixing rotator 130 mainly through its lower flow hole and flown to the peripheral side passing through the cells. This allows the fluid to be effectively sheared and uniformly mixed. The uniformly mixed fluid is let out of the stirring sink 110 and filled into the small portable container 160.

Figure 4:
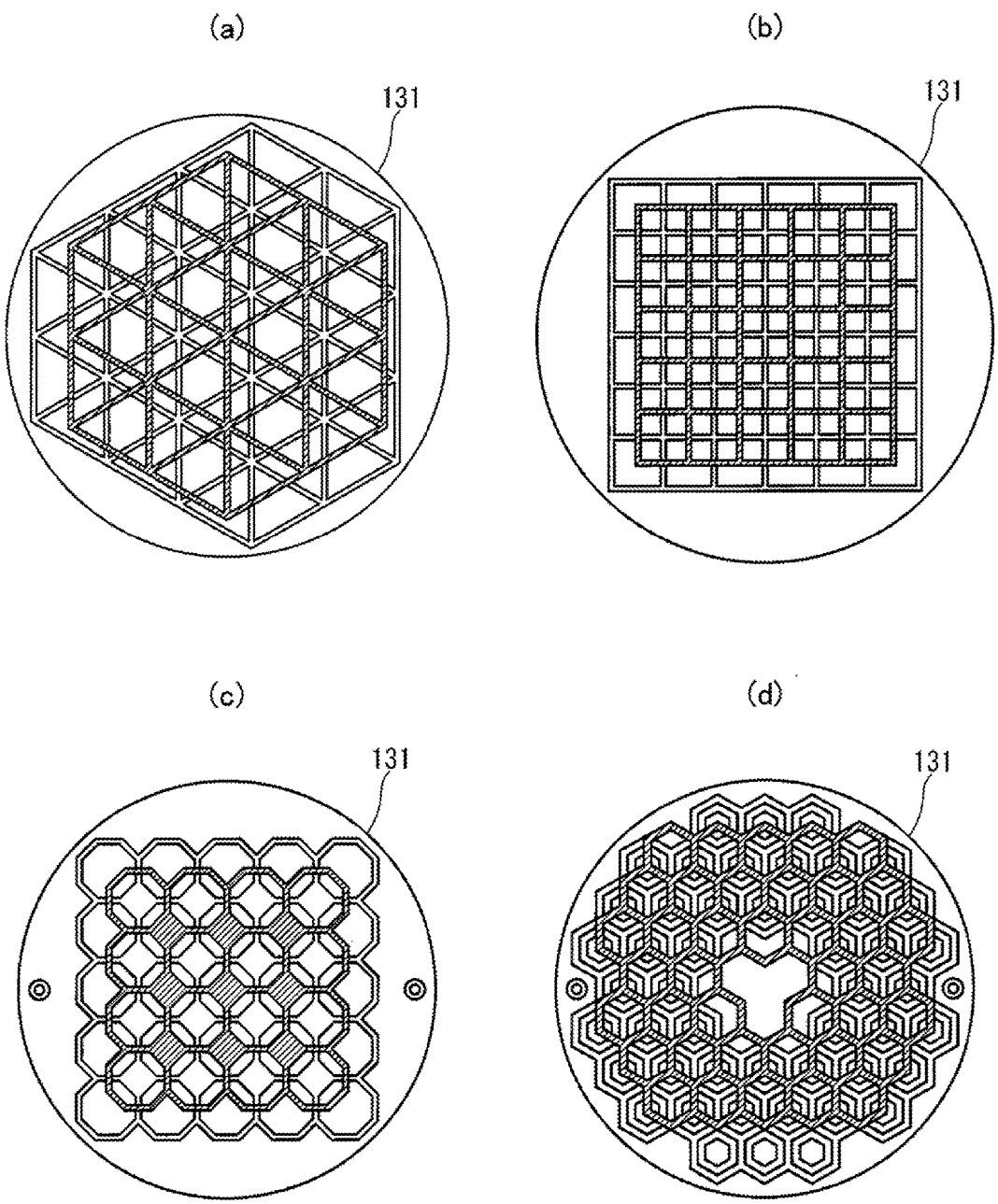
FIG. 4 is a view showing various forms of honeycomb cells.

FIG. 4 is a view showing various forms of honeycomb cells. FIG. 4(a) shows triangular cells. FIG. 4(b) shows square cells. FIG. 4(c) shows octagonal cells. FIG. 4(d) shows hexagonal cells.

The stirring sink 110 may have more than one mixing rotators. In such cases, the mixing rotators are disposed such that the two large/small disks of two adjacent mixing rotators face each other.

<<Method of Producing Mixed Refrigerant>>

Below described with reference to FIG. 1 is methods of producing mixed refrigerant according to the present invention. The base material container 150 contains mixed refrigerant separated in gas and liquid phases. The top of the base material container 150 is connected to a gas phase valve 151, which is connected to the rotating-type gas-liquid mixing device 101. The base material container 150 is also connected to a liquid phase valve 153, which is connected to the rotating-type gas-liquid mixing device 101.

The gas phase valve 151 and the liquid phase valve 153 each has a manometer or flowmeter (not illustrated) for measuring the amount of the gas and liquid flowing therethrough. The gas phase valve 151 and the liquid phase valve 153 can be controlled so as to let the gas and liquid flow into the rotating-type gas-liquid mixing device 101 with a desired gas-liquid composition ratio.

The small portable container 160 has a is connected to a valve 159, which is closed when the mixed refrigerant in the base material container 150 is introduced into the rotating-type gas-liquid mixing device 101.

The rotating motor 120 drives the mixing rotator 130 to rotate for a predetermined period so as to uniformly mix the content in the rotating-type gas-liquid mixing device 101. By this action, the content in the pipelines is also uniformly mixed.

Then the valve 159 is opened so as to introduce the uniformly mixed refrigerant into the small portable container 160. One or more small portable containers 160 containing uniformly mixed refrigerant with a desirable composition ratio are obtained. The valve 159 may have a manometer or flowmeter for measuring the amount of the mixed refrigerant introduced into the small portable containers 160.

<<Container of Mixed Refrigerant having Cylindrical Casing and Oscillable-and-Vibrable Coil Spring>>

Figure 5:
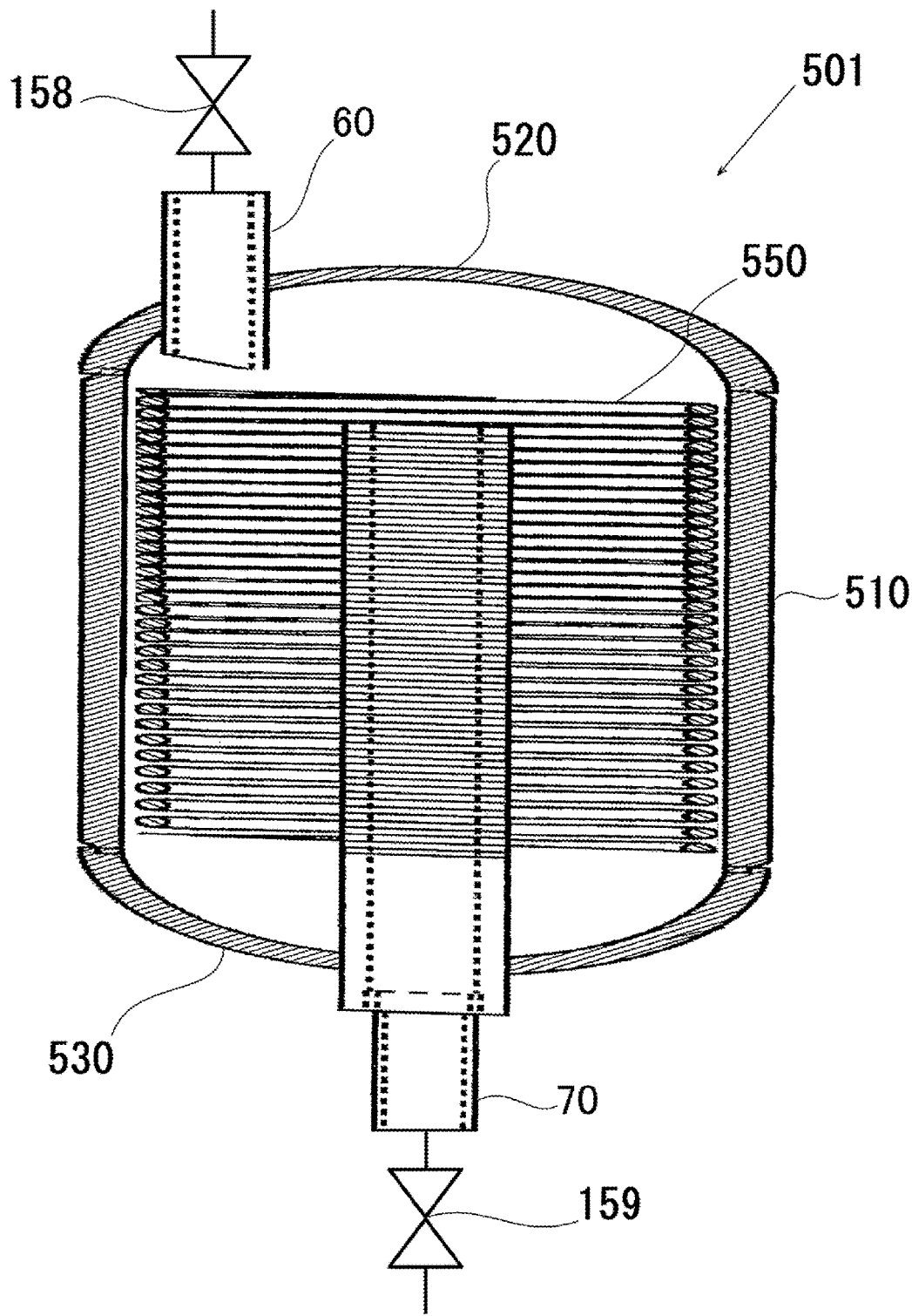
FIG. 5 is a cross-sectional view of an exemplified container of mixed refrigerant.

FIG. 5 is a cross-sectional view of an exemplified container of mixed refrigerant 501. The container of mixed refrigerant 501 has a cylindrical casing 510, end plates 520, 530 formed on the both axial ends of the cylindrical casing 510, an upper pipe 60 and a lower pipe 70 penetrating into the cylindrical casing 510 and coil spring 550 which is oscillable and vibrable.

The container of mixed refrigerant 501 does not have the above-mentioned honeycomb cells, but has a coil spring 550 accommodated in the cylindrical casing 510. The coil spring 550 is a spirally wound spring having an outer diameter smaller than the inner diameter of the cylindrical casing 510. The dimensions of the coil spring 550 is determined such that its outer wall is spaced apart from the inner wall of the cylindrical casing 510 preferably by 0.1 mm to 5 mm. This allows the coil spring 550 to oscillate and vibrate.

The cylindrical casing 510 together with the end plates 520, 530 forms a hermetically sealed chamber, which has a mechanical strength enough to stand fluid pressure of 10 MPa or more. The upper end plate 520 is penetrated by the upper pipe 60, and the lower end plate 530 is penetrated by the lower pipe 70. The upper pipe 60 and the lower pipe 70 respectively function as openings of the container of mixed refrigerant 501, through which mixed refrigerant is let in/out. The upper pipe 60 and the lower pipe 70 are positioned so as not to be axially aligned with each other. This prevents the mixed refrigerant let in through one of the pipes to directly flow out through the other. The upper pipe 60 and the lower pipe 70 respectively have inlet/outlet valves 158 and 159. The container of mixed refrigerant 501 can store mixed refrigerant by closing the inlet/outlet valves 158 and 159.

It is possible to store in the container of mixed refrigerant 501 mixed refrigerant produced according to the above-described method which has an amount and a composition ratio suitable to be introduced into a particular heat pump system.

The inlet/outlet valves 158 and 159 are openable/closable. This means that the container of mixed refrigerant 501 may be used as a part of the pipelines of an operating heat pump system. In FIG. 5, fluid may be let in through the upper pipe 60 and flow to cause the coil spring 550 to be oscillated and vibrated, to collide with the lower end plate 530, to again cause the coil spring 550 to be oscillated and vibrated, to collide with the upper plate 520 and to be let out through the lower pipe 70.

Alternatively, fluid may be let in through the lower pipe 70 and flow to cause the coil spring 550 to be oscillated and vibrated, to collide with the upper plate 520, to again cause the coil spring 550 to be oscillated and vibrated, to collide with the lower end plate 530 and to be let out through the upper pipe 60.

Thus, the container of mixed refrigerant 501 may be used as a part of the pipelines of an operating heat pump system.

In operation of a heat pump system, a compressor compresses fluid typically at 0.2 to 10 MPa to cause it to flow in the system. The flow typically contains mixed refrigerant and refrigerator oil. In the container of mixed refrigerant 501, the coil spring 550 freely oscillates and vibrates in its axial and radial directions so as to uniformize the pressure of fluid flowing therethrough. The coil spring 550 shears and declusters fluid flowing therethrough, thereby uniformly mixing the content of the fluid such as mixed refrigerant and refrigerator oil. This contributes not only to maintaining a uniform and suitable composition ratio of mixed refrigerant, but also to preventing refrigerator oil from adhering to the heat exchanging members, thereby improving the heat exchange efficiency.

The container of mixed refrigerant 501 can be installed on a heat pump system by implementing a bypass establishing step, a container connecting step, a vacuuming step, a bypass closing step, a filling step and an operation resuming step.

In the bypass establishing step, a bypass passage is established on one of the pipelines of the heat pump system.

In the container connecting step, a container of mixed refrigerant is connected to the heat pump system such that the two openable/closable openings communicate with the bypassed pipeline by way of three-way valves (joints). The three-way valves are operable so as to open either of the bypass passage or the passage through the container of mixed refrigerant.

In the vacuuming step, the three-way valves are operated to close the passage through the container of mixed refrigerant and vacuum the heat pump system through the bypass passage using a vacuuming pump.

In the bypass closing step, the three-way valves are operated to close the bypass passage such that the container of mixed refrigerant forms part of the pipeline of the heat pump system. In this operation, the inlet/outlet valves 158 and 159 are closed.

In the filling step, the inlet/outlet valves 158 and 159 are operated to gradually open such that the content of the container of mixed refrigerant is filled into the heat pump system.

In the operation resuming step, the heat pump system starts operating so as to allow the mixed refrigerant contained in said container of mixed refrigerant to go around in the system. The compressor compresses fluid to cause it to flow in the heat pump system. The fluid flowing through the container of mixed refrigerant 501 causes the coil spring 550 to oscillate and vibrate so as to shear and uniformize the fluid.

<<Container of Mixed Refrigerant having Cylindrical Casing and Oscillable-and-Vibrable Coil Spring and Channelizing Units>>

Figure 6:
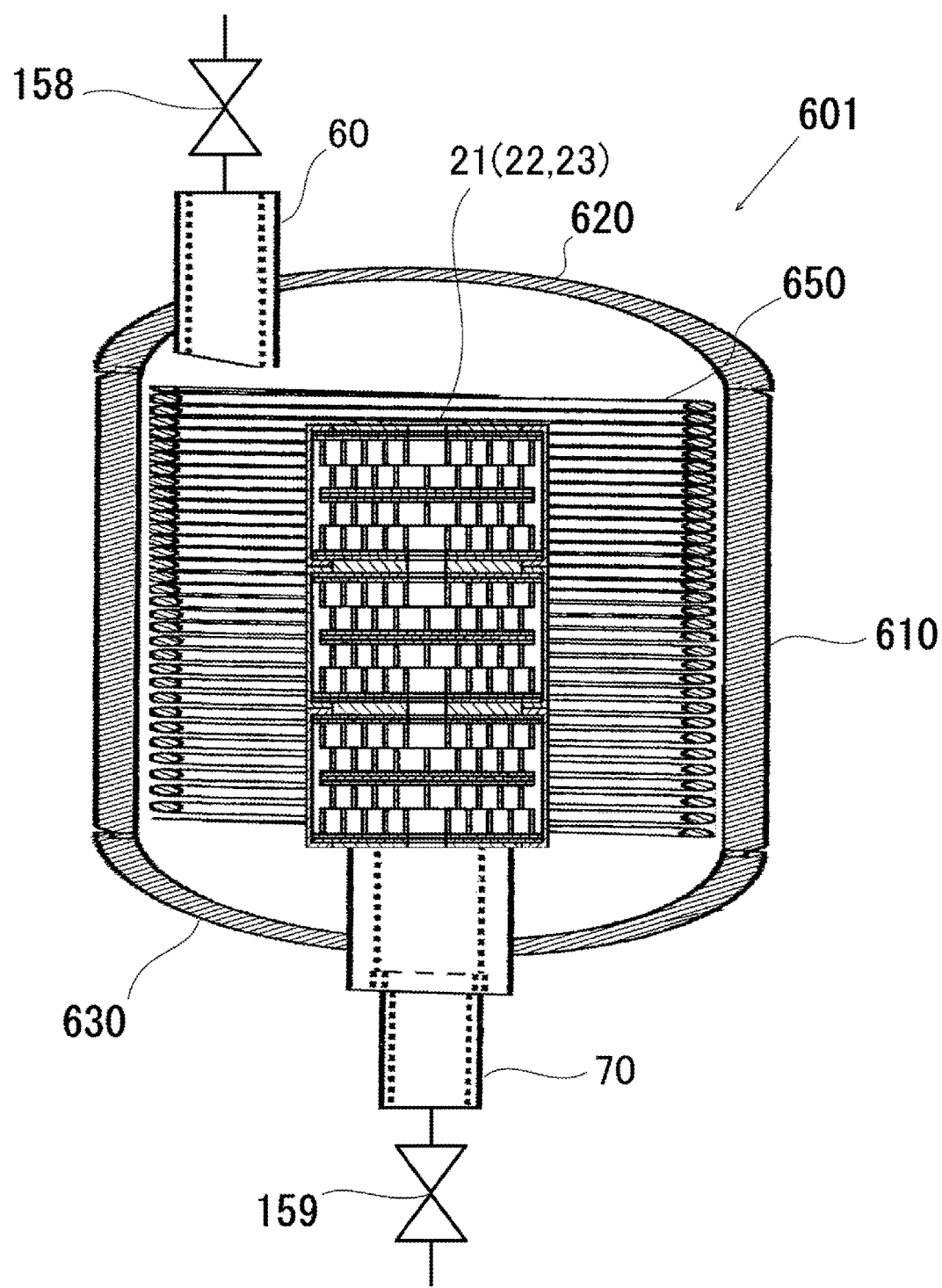
FIG. 6 is a cross-sectional view of an exemplified container of mixed refrigerant.

FIG. 6 is a view showing an exemplified container of mixed refrigerant 601.

The container of mixed refrigerant 601 has a cylindrical casing 610, end plates 620, 630 formed on the both axial ends of the cylindrical casing 610, an upper pipe 60 and a lower pipe 70 penetrating into the cylindrical casing 610, coil spring 650 which is oscillable and vibrable and channelizing units 21, 22, 23 connected to the lower pipe 70. The channelizing units 21, 22, 23 are respectively similar members to the above-described mixing rotator 130. The channelizing units 21, 22, 23 are configured such that the two large/small disks of two adjacent mixing rotators face each other. The channelizing units 21, 22, 23 are not driven to be rotated.

The container of mixed refrigerant 601 differs from the container of mixed refrigerant 501 in that it further has the channelizing units 21, 22, 23. Similar to the container of mixed refrigerant 501, the container of mixed refrigerant 601 has the cylindrical casing 610 accommodating the coil spring 650 which is oscillable and vibrable, and the coil spring 650 is determined such that its outer wall is spaced apart from the inner wall of the cylindrical casing 610 preferably by 0.1 mm to 5 mm.

The channelizing units 21, 22, 23 are each formed with a flow hole so as to pass the fluid therethrough.

As shown in FIG. 6, the channelizing units 21, 22, 23 are housed by a cylindrical casing, which may have pores to let fluid in and out.

Similar to the container of mixed refrigerant 501, the container of mixed refrigerant 601 together with the end plates 620,6530 forms a hermetically sealed chamber, which has a mechanical strength enough to stand fluid pressure. The upper end plate 620 is penetrated by the upper pipe 60, and the lower end plate 630 is penetrated by the lower pipe 70. The upper pipe 60 and the lower pipe 70 respectively function as openings of the container of mixed refrigerant 601, through which mixed refrigerant is let in/out. The upper pipe 60 and the lower pipe 70 are positioned so as not to be axially aligned with each other. This prevents the mixed refrigerant let in through one of the pipes to directly flow out through the other. The upper pipe 60 and the lower pipe 70 respectively have inlet/outlet valves 158 and 159. The container of mixed refrigerant 601 can store mixed refrigerant by closing the inlet/outlet valves 158 and 159.

It is possible to store in the container of mixed refrigerant 601 mixed refrigerant produced according to the above-described method which has an amount and a composition ratio suitable to be introduced into a particular heat pump system.

The inlet/outlet valves 158 and 159 are openable/closable. This means that the container of mixed refrigerant 601 may be used as a part of the pipelines of an operating heat pump system. In FIG. 6, fluid may be let in through the upper pipe 60 and flow to cause the coil spring 650 to be oscillated and vibrated, to collide with the lower end plate 630, to again cause the coil spring 650 to be oscillated and vibrated, to collide with the upper plate 620, to flow through the channelizing units 21, 22, 23 and to be let out through the lower pipe 70. In case the cylindrical casing of the channelizing units 21, 22, 23 has pores, fluid is also flows in and out through the pores.

Alternatively, fluid may be let in through the lower pipe 70 and to flow through the channelizing units 21, 22, 23 to cause the coil spring 650 to be oscillated and vibrated, to collide with the upper plate 620, to again cause the coil spring 650 to be oscillated and vibrated, to collide with the lower end plate 630 and to be let out through the upper pipe 60. In case the cylindrical casing of the channelizing units 21, 22, 23 has pores, fluid is also flows in and out through the pores.

The cylindrical casing of the channelizing units 21, 22, 23 may have pores to let fluid in and out in case the flow resistance of the channelizing units 21, 22, 23 is considerably high. The pores also enforce the shearing of fluid as they let fluid flow in therethrough and collide with the cells of channelizing units 21, 22, 23.

Thus, the container of mixed refrigerant 601 may be used as a part of the pipelines of an operating heat pump system.

Similar to the container of mixed refrigerant 501, the container of mixed refrigerant 601 is capable of uniformizing the pressure of fluid flowing therein and shearing and declustering fluid flowing therein, thereby uniformly mixing the content of the fluid such as mixed refrigerant and refrigerator oil. This contributes not only to maintaining a uniform and suitable composition ratio of mixed refrigerant, but also to preventing refrigerator oil from adhering to the heat exchanging members, thereby improving the heat exchange efficiency.

The container of mixed refrigerant 601 can be installed on a heat pump system in a similar way to the container of mixed refrigerant 501.

<<Container of Mixed Refrigerant having Channelizing Units and Outer Tank>>

Figure 7:
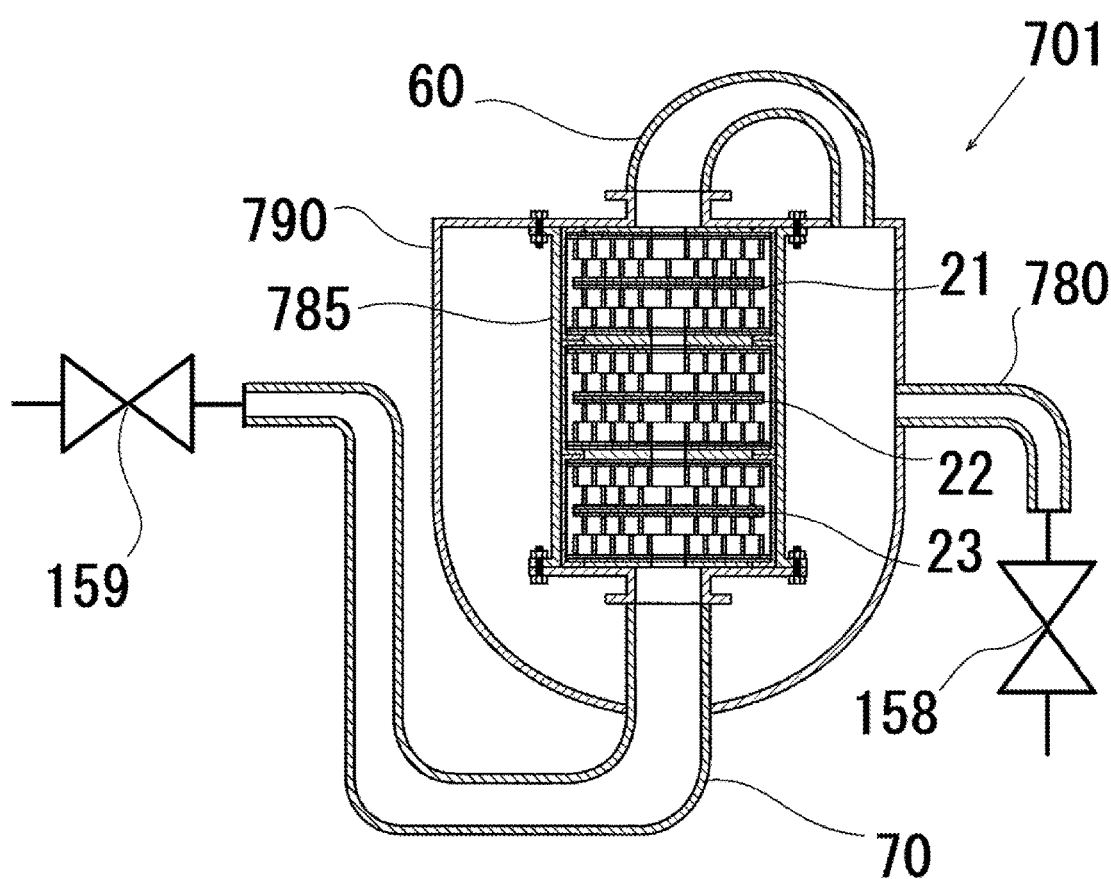
FIG. 7 is a cross-sectional view of an exemplified container of mixed refrigerant.

FIG. 7 is a view showing an exemplified container of mixed refrigerant 701. The container of mixed refrigerant 701 has a cylindrical casing 785 housing channelizing units 21, 22, 23, an outer tank 790 accommodating the cylindrical casing 785, a lower pipe 70 and an upper pipe 60. The lower pipe 70 is connected to the bottom of the channelizing unit 23 on one end and to an inlet/outlet valve 150 on the other end. The upper pipe 60 is connected to the top of the channelizing unit 21 on one end and to the outer tank 790 on the other end.

The channelizing units 21, 22, 23 and the cylindrical casing 785 have similar structure and functions to those of the container of mixed refrigerant 601.

The outer tank 790 has a mechanical strength enough to stand fluid pressure of 10 MPa or more. The dimensions of the outer tank 790 is determined such that it can accommodate enough amount of mixed refrigerant for a particular heat pump system.

It is possible to store in the container of mixed refrigerant 701 mixed refrigerant produced according to the above-described method which has an amount and a composition ratio suitable to be introduced into a particular heat pump system.

The inlet/outlet valves 158 and 159 are openable/closable. This means that the container of mixed refrigerant 601 may be used as a part of the pipelines of an operating heat pump system. In FIG. 7, fluid may be let in through the inlet/outlet valve 158 and an outer tank pipe 780 and flow through the outer tank 790, the upper pipe 60, the channelizing units 21, 22, 23, the lower pipe 70 and be let out through the inlet/outlet valve 159. Part of the fluid flown into the channelizing units 21, 22, 23 will flow out back to the outer tank pipe 780 through the pores of the cylindrical casing 785.

Alternatively, fluid may be let in through the lower pipe 70 and to flow through the channelizing units 21, 22, 23, the upper pipe 60, the outer tank 790 and the outer tank pipe 780 and be let out through the inlet/outlet valve 158. Part of the fluid flown into the channelizing units 21, 22, 23 will flow out to the outer tank 790 through the pores of the cylindrical casing 785.

The number of the pores of the cylindrical casing 785 is determined so as to obtain a desired fluid shearing effect.

Thus, the container of mixed refrigerant 501 may be used as a part of the pipelines of an operating heat pump system.

In operation of a heat pump system, a compressor compresses fluid typically at 0.2 to 10 MPa to cause it to flow in the system. The flow typically contains mixed refrigerant and refrigerator oil. In the container of mixed refrigerant 701, the fluid collides with the cells of the channelizing units 21, 22, 23 resulting in uniformizing the pressure of fluid flowing therethrough. The collision causes fluid to be sheared and declustered, thereby uniformly mixing the content of the fluid such as mixed refrigerant and refrigerator oil. This contributes not only to maintaining a uniform and suitable composition ratio of mixed refrigerant, but also to preventing refrigerator oil from adhering to the heat exchanging members, thereby improving the heat exchange efficiency.

The container of mixed refrigerant 601 can be installed on a heat pump system in a similar way to the container of mixed refrigerant 501 or 601.

<<Container of Mixed Refrigerant having Channelizing Units, Coil Spring, Inner Tank and Outer Tank>>

Figure 8:
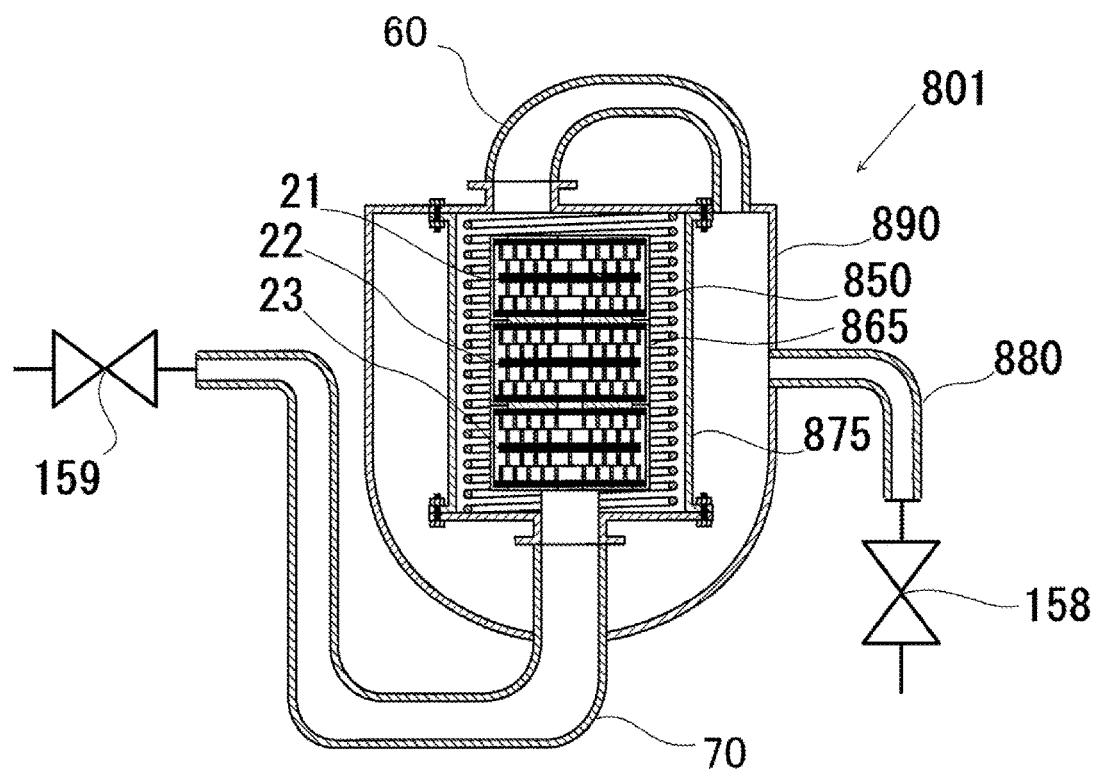
FIG. 8 is a cross-sectional view of an exemplified container of mixed refrigerant.

FIG. 8 is a view showing an exemplified container of mixed refrigerant 801. The container of mixed refrigerant 801 has a cylindrical casing 865 housing channelizing units 21, 22, 23, a coil spring 850 surrounding the cylindrical casing 865, an intermediate tank 875 accommodating the cylindrical casing 865 and the coil spring 850 and an outer tank 890 accommodating the intermediate tank 875.

The channelizing units 21, 22, 23 and the cylindrical casing 865 have similar structure and functions to those of the container of mixed refrigerant 601 or 701.

The outer tank 890 has a mechanical strength enough to stand fluid pressure of 10 MPa or more. The dimensions of the outer tank 890 is determined such that it can accommodate enough amount of mixed refrigerant for a particular heat pump system.

It is possible to store in the container of mixed refrigerant 801 mixed refrigerant produced according to the above-described method which has an amount and a composition ratio suitable to be introduced into a particular heat pump system.

The inlet/outlet valves 158 and 159 are openable/closable. This means that the container of mixed refrigerant 601 may be used as a part of the pipelines of an operating heat pump system. In FIG. 8, fluid may be let in through the inlet/outlet valve 158 and an outer tank pipe 880 and flow through the outer tank 890, the upper pipe 60 and the intermediate tank 875 to cause the coil spring 850 to be oscillated and vibrated, to collide with the intermediate tank 875 and flow through the channelizing units 21, 22, 23 and the lower pipe 70 and be let out through the inlet/outlet valve 159.

Part of the fluid flown into the channelizing units 21, 22, 23 will flow out back to the intermediate tank 875 through the pores of the cylindrical casing 865 and to the outer tank 890 through the pores of the intermediate tank 875. Fluid is finally to be let out through the lower pipe 70 and the inlet/outlet valve 159.

Alternatively, fluid may be let in through the lower pipe 70 and to flow through the channelizing units 21, 22, 23, the upper pipe 60, the outer tank 890 and the outer tank pipe 880 and be let out through the inlet/outlet valve 158. Part of the fluid flown into the channelizing units 21, 22, 23 will flow out to the outer tank 890 through the pores of the cylindrical casing 865.

The numbers of the pores of the cylindrical casing 865 and of the intermediate tank 875 are determined so as to obtain a desired fluid shearing effect.

Thus, the container of mixed refrigerant 801 may be used as a part of the pipelines of an operating heat pump system.

In operation of a heat pump system, a compressor compresses fluid typically at 0.2 to 10 MPa to cause it to flow in the system. The flow typically contains mixed refrigerant and refrigerator oil. In the container of mixed refrigerant 801, the fluid collides with the coil spring 850 and the cells of the channelizing units 21, 22, 23 resulting in uniformizing the pressure of fluid flowing therethrough. The collision causes fluid to be sheared and declustered, thereby uniformly mixing the content of the fluid such as mixed refrigerant and refrigerator oil. This contributes not only to maintaining a uniform and suitable composition ratio of mixed refrigerant, but also to preventing refrigerator oil from adhering to the heat exchanging members, thereby improving the heat exchange efficiency.

The container of mixed refrigerant 801 can be installed on a heat pump system in a similar way to the container of mixed refrigerant 501, 601 or 701.

<<Container of Mixed Refrigerant having Channelizing Units, Coil Spring and Outer Tank>>

Figure 9:
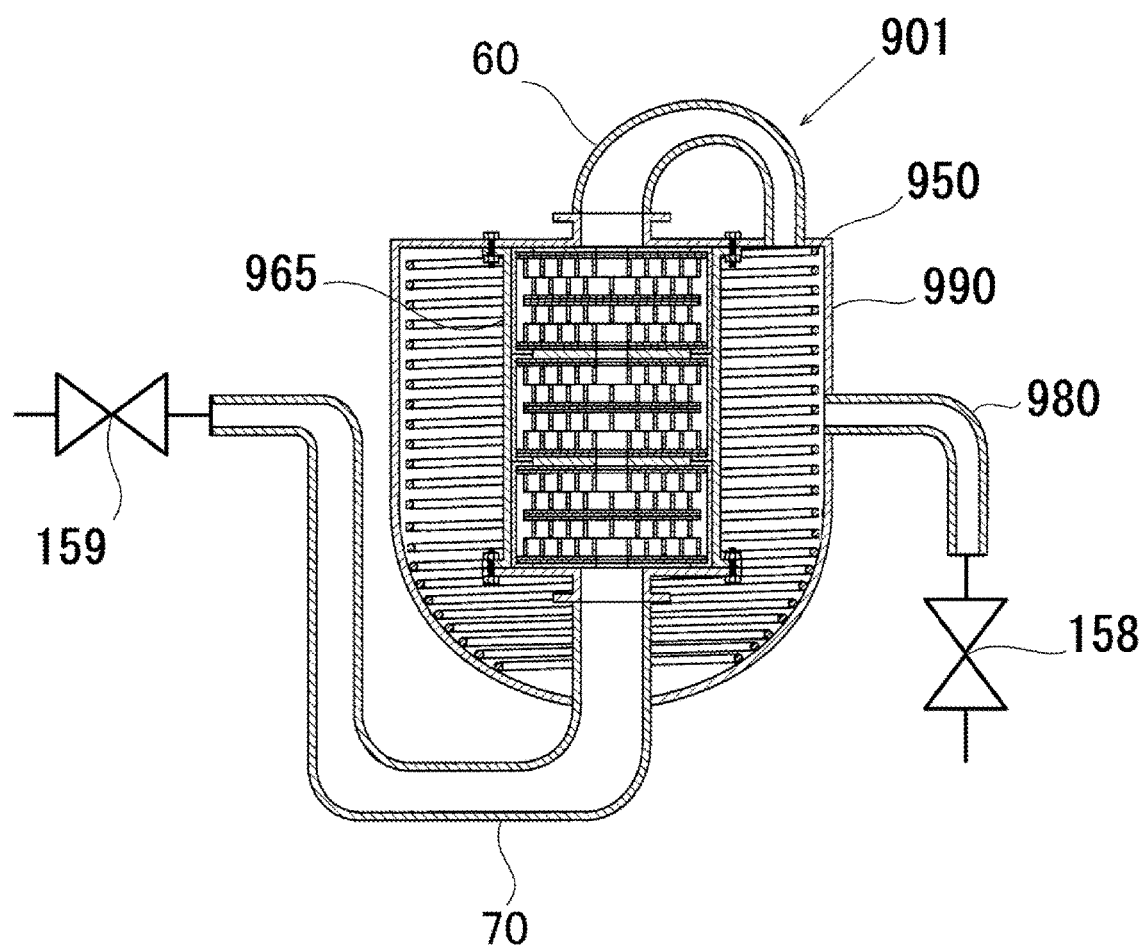
FIG. 9 is a cross-sectional view of an exemplified container of mixed refrigerant.

FIG. 9 is a view showing an exemplified container of mixed refrigerant 901. The container of mixed refrigerant 901 has a cylindrical casing 965 housing channelizing units 21, 22, 23, a coil spring 950 surrounding the cylindrical casing 965 and an outer tank 990 accommodating the cylindrical casing 965 and the coil spring 950.

The channelizing units 21, 22, 23 and the cylindrical casing 965 have similar structure and functions to those of the container of mixed refrigerant 601, 701 or 801.

The outer tank 990 has a mechanical strength enough to stand fluid pressure of 10 MPa or more. The dimensions of the outer tank 990 is determined such that it can accommodate enough amount of mixed refrigerant for a particular heat pump system.

It is possible to store in the container of mixed refrigerant 901 mixed refrigerant produced according to the above-described method which has an amount and a composition ratio suitable to be introduced into a particular heat pump system.

The inlet/outlet valves 158 and 159 are openable/closable. This means that the container of mixed refrigerant 901 may be used as a part of the pipelines of an operating heat pump system. In FIG. 9, fluid may be let in through the inlet/outlet valve 158 and an outer tank pipe 980 and flow through the outer tank 990 to cause the coil spring 950 to be oscillated and vibrated and flow through the upper pipe 60, the channelizing units 21, 22, 23 and the lower pipe 70 and be let out through the inlet/outlet valve 159. Part of the fluid flown into the channelizing units 21, 22, 23 will flow out back to the outer tank 990 through the pores of the cylindrical casing 965. Fluid is finally to be let out through the lower pipe 70 and the inlet/outlet valve 159.

Alternatively, fluid may be let in through the lower pipe 70 and to flow through the channelizing units 21, 22, 23, the upper pipe 60, the outer tank 990 and the outer tank pipe 980 and be let out through the inlet/outlet valve 158. Part of the fluid flown into the channelizing units 21, 22, 23 will flow out to the outer tank 990 through the pores of the cylindrical casing 965.

The number of the pores of the cylindrical casing 965 is determined so as to obtain a desired fluid shearing effect.

Thus, the container of mixed refrigerant 901 may be used as a part of the pipelines of an operating heat pump system.

In operation of a heat pump system, a compressor compresses fluid typically at 0.2 to 10 MPa to cause it to flow in the system. The flow typically contains mixed refrigerant and refrigerator oil. In the container of mixed refrigerant 901, the fluid collides with the coil spring 950 and the cells of the channelizing units 21, 22, 23 resulting in uniformizing the pressure of fluid flowing therethrough. The collision causes fluid to be sheared and declustered, thereby uniformly mixing the content of the fluid such as mixed refrigerant and refrigerator oil. This contributes not only to maintaining a uniform and suitable composition ratio of mixed refrigerant, but also to preventing refrigerator oil from adhering to the heat exchanging members, thereby improving the heat exchange efficiency.

The container of mixed refrigerant 901 can be installed on a heat pump system in a similar way to the container of mixed refrigerant 501, 601, 701 or 801.

<<Heat Pump System>>

The apparatus of the present invention may be employed in a heat pump system which functions as a heat exchanger by circulating refrigerant and refrigerator oil using electric energy or gas energy.

The heat pump system may be an air-conditioner, a freezer, a refrigerator, a boiler, a freezing warehouse, a chiller and the like. It is not limited to a heat pump system run by electricity but may also be that by other types of power source such as a gas turbine. The apparatus of the present invention can be adapted either to a yet-to-be-made heat pump system or to an existing heat pump system.

A heat pump system takes heat from a low temperature object and gives heat to a high temperature object for the purpose of cooling the low temperature object and/or warming the high temperature object. An air-conditioner switching between cooling operation and heating operation is also a heat pump system.

The term "fluid" used herein refers to that which is circulated in a heat pump system. It includes refrigerant and refrigerator oil. It can be either in a liquid, gas or gas-liquid mixed state in a heat pump system. Alternative chlorofluorocarbon is typically used as refrigerant.

Figure 10:
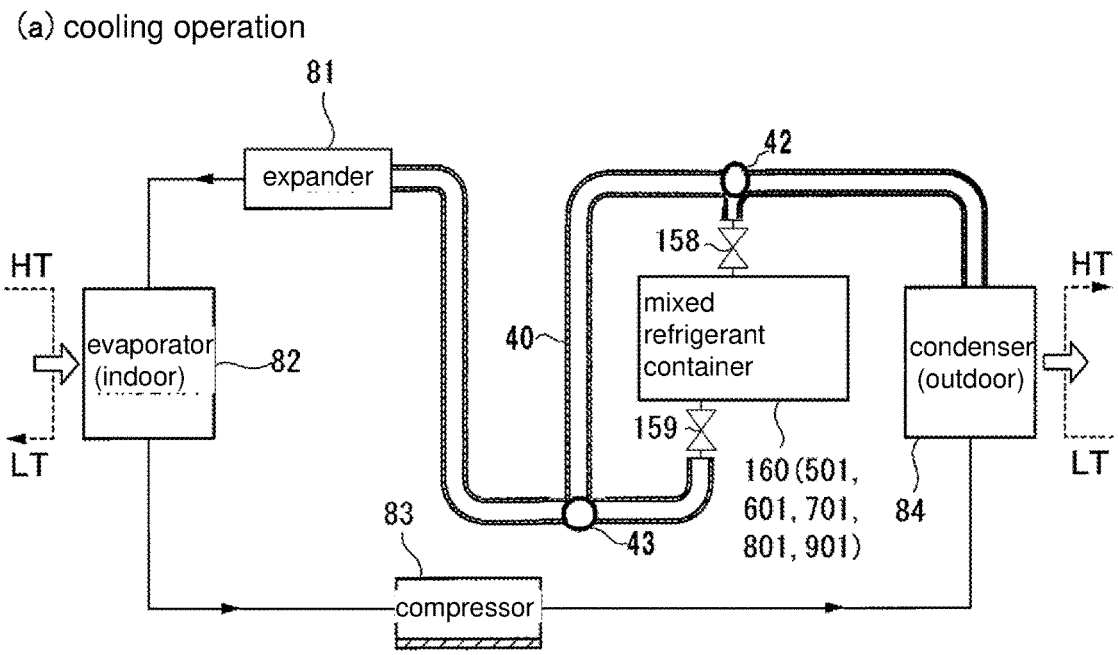
FIG. 10 is a view showing a heat pump system (heat pump cycle) using a container of mixed refrigerant in its cooling/heating operation.
Figure 10:
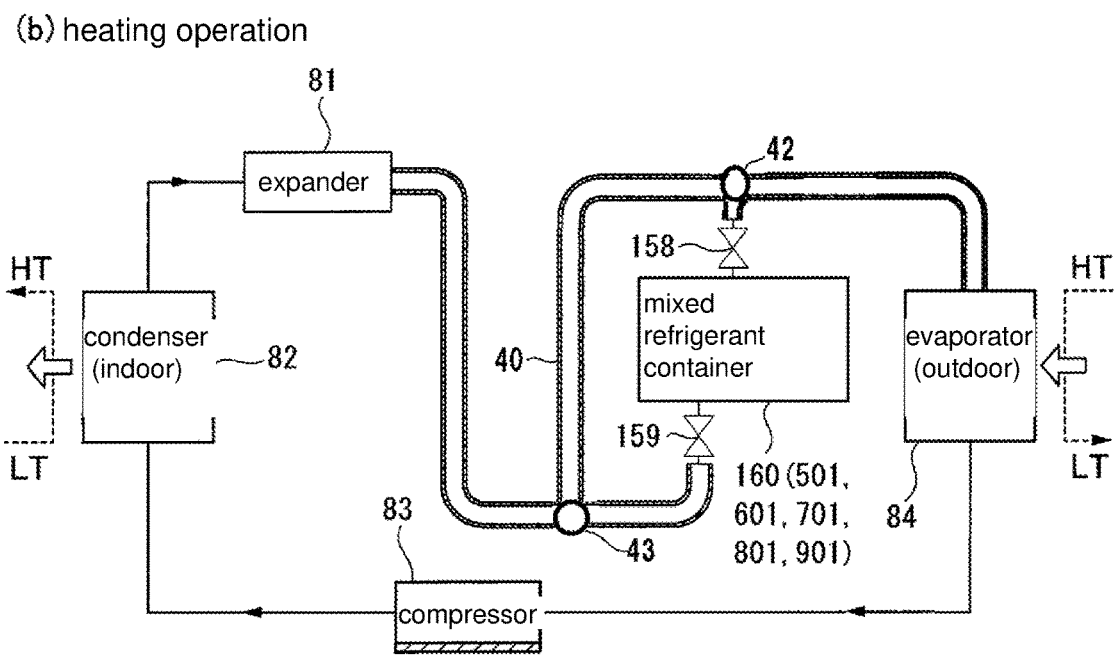

FIG. 10 is a view showing a heat pump system (heat pump cycle) using a container of mixed refrigerant in its cooling/heating operation.

Shown in FIG. 10 is a cross-sectional schematic view of a heat pump cycle adapted to an air-conditioner. A container of mixed refrigerant 160 (501, 601, 701, 801, 901) is juxtaposed with a bypass 40. Three-way valves 42, 43 are operated to allow fluid to flow through either the bypass or the container of mixed refrigerant 160. FIG. 10(*a*) shows the flow of fluid in cooling operation. FIG. 10(*b*) shows the flow of fluid in heating operation.

The heat pump cycle in its cooling operation consists of a compressor 83, a condenser (outdoor unit) 84, an expander 81 and an evaporator (indoor unit) 82. The heat pump cycle in its heating operation consists of a compressor 83, a condenser (indoor unit) 82, an expander 81 and an evaporator (outdoor unit) 84. These components together with pipelines form an enclosed conduit in which fluid circulates. The arrows in FIG. 10(*a*) and FIG. 10(*b*) indicate the flow direction of the fluid. The void arrows indicate transfer of heat from and into the condenser and the evaporator. The broken arrows indicate transfer of heat between the outdoor and the indoor. "LH" means low temperature and "HT" means high temperature.

Although the container of mixed refrigerant 160 (501, 601, 701, 801, 901) is adapted to the pipeline connecting the outdoor unit 84 and the expander 81 as shown in FIG. 10, it may be adapted to any part of the pipelines of the heat pump cycle.

In FIG. 10(*a*) and FIG. 10(*b*), the upper and lower three-way valves 42, 43 disposed on the pipe line of the heat pump cycle may be electromagnetic valves (not shown) or electric valves (not shown). The three-way valves are operable so as to open either of the bypass passage or the passage through the container of mixed refrigerant 160 (501, 601, 701, 801, 901).

The three-way valves 42, 43 each has a valve member and three openings. An electromagnetic valve, also called a solenoid valve, is operated by the action of electromagnet. An electric valve is operated by an electric mortar.

In the heat pump cycle in its cooling operation shown in FIG. 10(*a*), the compressor 83 has a sealed chamber with a refrigerator oil reservoir. The compressor 83 compresses gaseous refrigerant to have a high pressure and high temperature, which is mixed with the refrigerator oil and discharged to the condenser (outdoor unit) 84. In cooling operation, the condenser (outdoor unit) 84 conducts heat exchange by having the incoming high-temperature high-pressure gaseous fluid to dissipate heat to the outside and to be cooled and liquefied. The liquefied fluid is desirably a uniform mixture or solution of refrigerant and refrigerator oil.

Nevertheless, while refrigerant is liquefied in the condenser (outdoor unit) 84, there remains refrigerator oil which have not been mixed with or dissolved in the refrigerant or which have been fused to form oil phases enveloping liquefied refrigerant. There also remains refrigerator oil in the form of high-pressure gas even after passing the condenser (outdoor unit) 84. Thus, the liquefied fluid discharged from the condenser (outdoor unit) 84 possibly contains demixed refrigerator oil, refrigerant enveloped in the oil phases of the refrigerator oil and/or gaseous refrigerant.

Demixed refrigerator oil tends to adhere to the heat exchanging members in the condenser (outdoor unit) 84 and lowers the heat exchange efficiency. The container of mixed refrigerant 160 (501, 601, 701, 801, 901) according to the present invention allows fluid flowing therethrough to be refined and uniformly mixed by the action of oscillating and vibrating coil spring and by colliding with the honeycomb cells. This refined and uniformly mixed fluid circulates in the heat pump cycle without adhering to the heat exchanging members. Thus, the heat exchange efficiency is improved.

As shown in FIG. 10(*a*), the container of mixed refrigerant 160 (501, 601, 701, 801, 901) according to the present invention in the cooling operation is disposed between the condenser (outdoor unit) 84 and the expander 81. The inlet/outlet valve 158 is connected to the outlet of the condenser (outdoor unit) 84 while the inlet/outlet valve 159 is connected with the inlet of the expander 81. The fluid discharged from the condenser 84 is effectively sheared and mixed in the container of mixed refrigerant 160. Thus, the refrigerator oil having been unmixed gets uniformly mixed with the liquefied refrigerant, refrigerant having been enveloped in the oil phases of the refrigerator oil gets released and the residual gaseous refrigerant gets liquefied. The fluid flows from the container of mixed refrigerant 160 (501, 601, 701, 801, 901) according to the present invention to the expander 81.

The expander 81 has an expansion valve or a capillary tube. The liquid fluid with low temperature and low pressure passes through small tubes or pores to have further lower temperature and lower pressure and released to the evaporator (indoor unit) 82. The low-temperature low-pressure liquid fluid absorbs heat from the outside so as to evaporate into a high-temperature gaseous fluid. This causes the indoor air to be cooled. The gaseous fluid flows into the compressor 83.

The indoor unit (evaporator) 82 is allowed to operate with refrigerant and refrigerator oil which are refined and uniformly mixed, thereby improving the heat exchange efficiency.

<<Heat Pump Cycle in Heating Operation>>

In the heat pump cycle in its heating operation shown in FIG. 10(*b*), the fluid flows in the adverse direction. The heat pump system has a switching valve (not shown) for switching the flow direction of the fluid. When in heating operation, the compressor 83 discharges high-temperature high-pressure gaseous fluid, which flows into the condenser (indoor unit) 82. The incoming high-temperature high-pressure gaseous fluid dissipates heat to the outside and gets and liquefied. This causes the indoor air to be warmed.

Similar to the case in the above-described cooling operation shown in FIG. 10(*a*), the liquefied fluid discharged from the condenser (indoor unit) 82 possibly contains unmixed refrigerator oil, refrigerant enveloped in the oil phases of the refrigerator oil and/or gaseous refrigerant. In heating operation, the liquefied fluid discharged from the condenser (indoor unit) 82 flows into the expander 81, where it is expanded to have a low pressure and low temperature. The fluid having passed through the expander 81 still possibly contains unmixed refrigerator oil, refrigerant enveloped in the oil phases of the refrigerator oil and/or gaseous refrigerant.

As shown in FIG. 10(*b*), the container of mixed refrigerant according to the present invention in the heating operation is disposed between the expander 81 and the evaporator (outdoor unit) 84. The inlet/outlet valve 159 is connected to the outlet of the expander 81 while the inlet/outlet valve 158 is connected to the evaporator (outdoor unit) 84. The fluid discharged from the expander 81 is effectively sheared and mixed in the container of mixed refrigerant. Thus, the refrigerator oil having been unmixed gets uniformly mixed with the liquefied refrigerant, refrigerant having been enveloped in the oil phases of the refrigerator oil gets released and the residual gaseous refrigerant gets liquefied. The fluid flows from the container of mixed refrigerant to the evaporator (outdoor unit) 84.

In heating operation, the evaporator (outdoor unit) 84 conducts heat exchange by having the incoming low-temperature low-pressure liquid fluid to absorb heat from the outside and to be heated and vaporized. The vaporized fluid flows into the compressor 83. The indoor unit (condenser) 82 is allowed to operate with refrigerant and refrigerator oil which are refined and uniformly mixed, thereby improving the heat exchange efficiency.

As shown in FIG. 10(*a*) and FIG. 10(*b*), the container of mixed refrigerant according to the present invention is inserted on a pipeline of a heat pump system. Since such a pipeline consists of several tubular members, the container of mixed refrigerant can easily be adapted to a heat pump system by replacing one of the tubular members thereof. It may be installed on an outdoor part of the pipeline.

As shown in FIG. 10, the bypass 40 and the three-way valves 42, 43 allow the container of mixed refrigerant to be easily replaced with a new one, which may have a different composition ratio or a different gas-liquid mixing function.

Described in the above is an embodiment of the container of mixed refrigerant adapted to a basic-type heat pump system according to the present invention. The container of mixed refrigerant can also be adapted to different types of heat pump system equipped with various additional components. It can be adapted to, for example, a heat pump system equipped with a gas-liquid separator. It can also be adapted to a heat pump system having an ejector and a gas-liquid separator in place of an expander.

<<Switching between Heating/Cooling Operation>>

The container of mixed refrigerant 160 (501, 601, 701, 801, 901) has the channelizing units 21, 22, 23 each having a flow hole such that it works in whichever direction fluid flows.

If it does not work well, four-way valves and electromagnetic/electric valves may be used so as to make fluid flow in the same direction both in heating and cooling operations.

<<Coil Springs with Various Pitches>>

The above-mentioned coil spring 550, 650, 850, 950 may be unequally pitched. For example, it may have its upper and lower parts narrowly pitched and its middle part widely pitched, or it may have its upper and lower parts widely pitched and its middle part narrowly pitched.

<<Material of Container of Mixed Refrigerant>>

The container of mixed refrigerant according to the present invention can be made of any material which is suitable to be used for pipelines of a heat pump system, such as steel.

<Mechanism of Action>

Described below are the mechanisms of action of overtone resonance (scaling resonance).

In the container of mixed refrigerant, flow of fluid with a pressure of several megapascals adds impact to the coil springs, forcing them to vibrate and oscillate. The vibration and oscillation is transmitted so as to generate sound, which may be audible or non-audible. The sound is continuously generated as long as the flow of fluid is kept.

Collision of the clusters of refrigerant and refrigerator oil also generates sound. Those two kinds of sound are considered to be in harmonic relationship as the overtone of the former (higher harmonics) resonates the latter (scaling resonance). This is considered to promote stirring and mixing of fluid, and liquefaction.

Scaling resonance is a phenomenon that higher harmonics or overtone, which is tens of octaves higher, causes resonance. (Yoichi Fukagawa (1999), *Protein Music*, Tokyo, Chikuma-shobo.)

Resonance and sympathizing are distinguished herein. Whereas sympathizing occurs when vibration or oscillation is transmitted via solid, resonance occurs when vibration or oscillation is transmitted via fluid such as water and gas.

In the container of mixed refrigerant, it is considered that the vibration and oscillation of the coil springs is transmitted to refrigerant and refrigerator oil via fluid (liquid material), and thus overtone resonance (scaling resonance) occurs as long as the flow of fluid is kept.

In the container of mixed refrigerant, fluid, viewed from a macro-viewpoint, imparts impact to the coil spring and causes it to be vibrated and oscillated. Viewed from a micro-viewpoint, clusters of refrigerant and refrigerator oil are caused to be declustered by the action of overtone resonance (scaling resonance) and evenly dispersed.

Effects

Fluid containing of refrigerant and refrigerator oil is flown through the container of mixed refrigerant at a pressure of 0.2 to 10 MPa. The flow imparts impact on the coil spring causes it to be vibrated and oscillated. This vibration and oscillation causes generation of sound waves of various frequencies. Most of the generated higher harmonic waves are considered to be overtones, which decluster refrigerant and refrigerator oil by the action of sympathizing or resonance. Refrigerant and refrigerator oil are thus evenly dispersed.

<Reduction of Power and Energy Consumption>

The apparatus of the present invention contributes to effective reduction of power and energy consumption when applied in a heat pump system in which refrigerant and refrigerator oil is circulated.

REFERENCE SYMBOLS 21, 22, 23 channelizing unit
40 bypass
42, 43 three-way valve
60, 70 upper pipe, lower pipe
81 expander
82 indoor unit (evaporator/condenser in cooling/heating operation)
83 compressor
84 outdoor unit (condenser/evaporator in cooling/heating operation)
101 rotating-type gas-liquid mixing device
110 stirring sink
120 rotating motor
125 rotating shaft
130 mixing rotator
131 large disk
132 small disk
150 base material container
151 gas phase valve
153 liquid phase valve
158, 159 inlet/outlet valve
160 small portable container
501 container of mixed refrigerant
520 upper end plate
530 lower end plate
550 coil spring
601 container of mixed refrigerant (with coil spring and channelizing units)
620 upper end plate
630 lower end plate
650 coil spring
701 container of mixed refrigerant (with channelizing units and outer tank)
780 outer tank pipe
785 cylindrical casing
790 outer tank
801 container of mixed refrigerant (with channelizing units, coil spring, intermediate tank and outer tank)
850 coil spring
865 cylindrical casing
875 intermediate tank
880 outer tank pipe
890 outer tank
901 container of mixed refrigerant (with channelizing units, coil spring and outer tank)
950 coil spring
965 cylindrical casing
980 outer tank pipe
990 outer tank

What is claimed is:

1. A mixed refrigerant producing apparatus comprising:
   a base material container containing mixed refrigerant separated in gas and liquid phases;
   a gas-liquid mixing device capable for uniformly mixing the gas and liquid phases of the mixed refrigerant, said gas-liquid mixing device having a pair of contiguously mounted rotatable honeycombed disks, whereby liquid is introduced through a centrally located lower flow hole and in between said at least a pair of disks for passage of said liquid therethrough in a radially directed and undulating manner from said centrally located lower flow hole to a peripheral side of said pair of disks as said pair of disks are rotated to reduce fluidic shear;
   a liquid-phase valve allowing the liquid phases of the mixed refrigerant in said base material container to be introduced into said gas-liquid mixing device;
   a gas-phase valve allowing the gas phases of the mixed refrigerant in said base material container to be introduced into said gas-liquid mixing device; and
   an outlet valve allowing the mixed refrigerant in said gas-liquid mixing device to be filled into a small portable container; wherein
   said outlet valve opens when said gas-liquid mixing device has been operated during a predetermined time to uniformly mix the mixed refrigerant contained therein.

2. A method of producing mixed refrigerant using the mixed refrigerant producing apparatus as set forth in claim 1 comprising the steps of:
   introducing into said gas-liquid mixing device the gas phase and the liquid phase of the mixed refrigerant respectively;
   passing said introduced gas phase and said liquid phase between at least a pair of contiguously mounted rotatable honeycombed disks for passage therethrough in a radially directed and undulating manner as said pair of disks are rotated to reduce fluidic shear;
   operating said gas-liquid mixing device during a predetermined time; and
   filling into the small portable container the mixed refrigerant in said gas-liquid mixing device.

3. A container of mixed refrigerant capable of containing mixed refrigerant having an amount and a composition ratio suitable to be introduced into a heat pump system,
   said container having a coil spring mounted therein which is freely oscillating and vibrating in both a radial direction and an axial direction for uniformizing the pressure of the fluid within the container;
   said container of mixed refrigerant comprising two openable/closable openings which are adaptable to pipelines of the heat pump system,
   said container of mixed refrigerant being configured to allow mixed refrigerant to flow in through one of said openings, to pass therethrough and to flow out of the other of said openings while the heat pump system is in operation.

4. A method of use of the container of mixed refrigerant as set forth in claim 3 comprising the steps of:
   providing a bypass passage on a pipeline of a heat pump system;
   providing said container of mixed refrigerant such that said two openable/closable openings communicate with the bypass passage;
   vacuuming the pipeline through said bypass passage;
   closing said bypass passage such that said container of mixed refrigerant forms part of the pipeline of the heat pump system;
   filling into the heat pump system the mixed refrigerant contained in said container of mixed refrigerant by opening said two openable/closable openings; and
   operating the heat pump system so as to allow the mixed refrigerant contained in said container of mixed refrigerant to go around in the system.

5. A container of mixed refrigerant capable of containing mixed refrigerant having an amount and a composition ratio suitable to be introduced into a particular heat pump system comprising:
two openable/closable openings which are adaptable to the pipelines of the heat pump system, and
a gas-liquid mixing device wherein said container has a coil spring mounted therein which is freely oscillating and vibrating in both a radial direction and an axial direction for uniformizing the pressure of the fluid within the container.

6. A method of use of the container of mixed refrigerant as set forth in claim 5 comprising:
providing a bypass passage on a pipeline of a heat pump system;
providing said container of mixed refrigerant such that said two openable/closable openings communicate with the bypass passage;
vacuuming the pipeline through said bypass passage;
closing said bypass passage such that said container of mixed refrigerant forms part of the pipeline of the heat pump system;
filling into the heat pump system the mixed refrigerant contained in said container of mixed refrigerant by opening said two openable/closable openings; and
operating the heat pump system so as to allow the mixed refrigerant contained in said container of mixed refrigerant to go around in the system,
whereby said gas-liquid mixing function of said container of mixed refrigerant allows the mixed refrigerant flowing therethrough to be mixed.

* * * * *